United States Patent [19]

Koslowski

[11] Patent Number: 5,154,874
[45] Date of Patent: Oct. 13, 1992

[54] METHOD OF PRODUCING GYPSUM/FIBER BOARD, ESPECIALLY FOR FLOOR BOARDS

[75] Inventor: Thomas Koslowski, Aachen, Fed. Rep. of Germany

[73] Assignees: Pro Mineral Gesellschaft Zur Verwendung Von Mineralstoffen MBH, Essen; SICOWA Verfahren Stechnik fur Baustoffe GmbH, Aachen, both of Fed. Rep. of Germany

[21] Appl. No.: 668,273

[22] Filed: Mar. 11, 1991

[30] Foreign Application Priority Data

Mar. 14, 1990 [DE] Fed. Rep. of Germany ........ 4008084

[51] Int. Cl.⁵ ................. B28B 3/00; B29C 67/02; D21B 1/04
[52] U.S. Cl. ................. 264/333; 264/37; 264/102; 264/115; 264/117; 264/120; 264/122; 264/DIG. 69
[58] Field of Search ........... 264/120, 117, 122, 128, 264/333, 118, 101, 102, 115, DIG. 69, 37; 106/772, 778, 779, 780, 711

[56] References Cited

U.S. PATENT DOCUMENTS

| | | | |
|---|---|---|---|
| 3,468,414 | 9/1969 | Harris | 106/780 X |
| 3,885,980 | 5/1975 | Noone | 106/772 |
| 3,920,465 | 11/1975 | Burkard et al. | 106/780 |
| 4,067,939 | 1/1978 | Lowe et al. | 264/333 X |
| 4,120,737 | 10/1978 | Berrie et al. | 106/772 |
| 4,127,628 | 11/1978 | Uchida et al. | 264/333 X |
| 4,239,716 | 12/1980 | Ishida et al. | 264/333 X |
| 4,265,979 | 5/1981 | Baehr et al. | 264/333 X |
| 4,328,178 | 5/1982 | Kossatz | 264/333 X |
| 4,445,937 | 5/1984 | Bassier et al. | 106/772 X |
| 4,902,348 | 2/1990 | Kossatz et al. | 106/780 |
| 4,965,031 | 10/1990 | Conroy | 264/333 X |
| 4,966,739 | 10/1990 | Stipek et al. | 264/333 X |
| 5,015,450 | 5/1991 | Koslowski | 264/333 X |
| 5,041,333 | 8/1991 | Conroy | 106/780 X |

FOREIGN PATENT DOCUMENTS

| | | | |
|---|---|---|---|
| 150859 | 8/1985 | European Pat. Off. | 264/333 |
| 3216886 | 11/1983 | Fed. Rep. of Germany . | |
| 23621 | 2/1979 | Japan | 264/333 |
| 1438404 | 6/1976 | United Kingdom | 264/333 |

*Primary Examiner*—Karen Aftergut
*Attorney, Agent, or Firm*—Herbert Dubno

[57] ABSTRACT

Gypsum/fiber board, especially for use as floor board, is fabricated by preparing a binder consisting of at least 60% by weight of calcium sulfate alpha hemihydrate, and at most 35% by weight calcium sulfate beta hemihydrate, the balance, if any, inert material such as grinding residues from finished plaster board, in an amount of 100 parts by weight of the binder to 20 parts by weight of fiber, especially cellulose fiber or a mixture of cellulose fiber from scrap paper with reinforcing fiber. This dry mixture combined is with water in an amount such that no water can be expressed from the prepared mix by the subsequent pressing step and the prepared mix is then pressed in a peripherally-closed form such that the finished gypsum/fiber board will have a raw density of at least 1.5 g/cm².

20 Claims, 1 Drawing Sheet

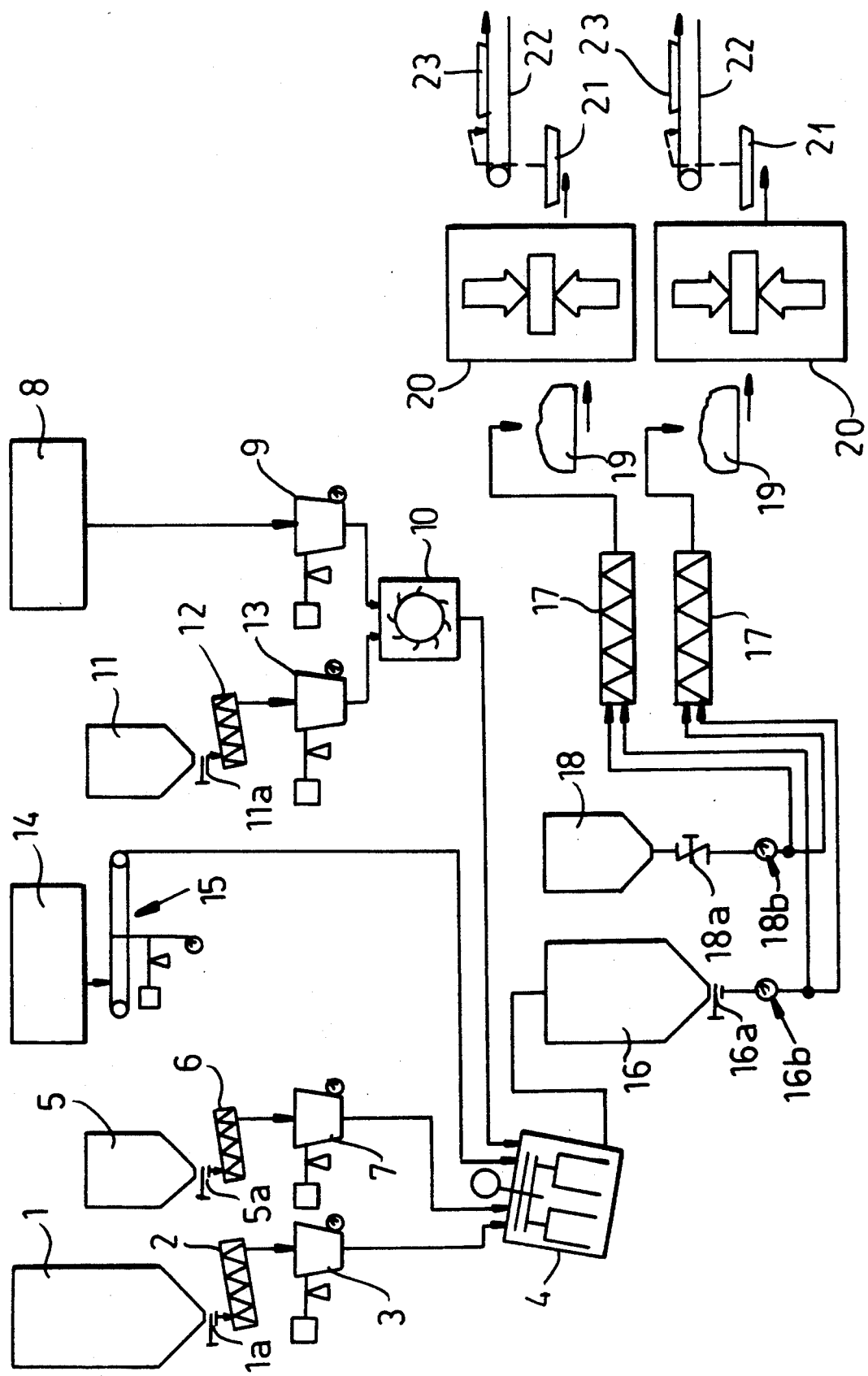

METHOD OF PRODUCING GYPSUM/FIBER BOARD, ESPECIALLY FOR FLOOR BOARDS

FIELD OF THE INVENTION

My present invention relates to a method of producing gypsum/fiber board, especially for use as floor board, and, more particularly, to a method wherein finely divided gypsum binder and fibers are mixed, the dry mix is combined with the preparation or mixing water required to cause setting of the composition, and the prepared mixture is shaped to form an intermediate product which is pressed in a press to gypsum/fiber board, is caused to harden, is dried, and, if necessary or desirable, is subjected to further treatment such as a trimming or shaping operation. The preparation water is, of course, a quantity of water which will suffice to cause hydration of the gypsum binder.

BACKGROUND OF THE INVENTION

It is known from German open application DE-OS 32 16 886, for example, to fabricate gypsum/fiber board in the aforedescribed manner utilizing so-called plaster of Paris as the gypsum binder, i.e. calcium sulfate beta hemihydrate. The prepared mixture is spread onto a pressing plate and is shaped to the intermediate product which has a mat-like character.

The pressing is effected between the press plates of a platen press with the periphery of the board being open in the sense that the board is pressed between a pair of spacer bars so that the sides of the board extending between the bars are not flanked by board-shaping members.

The gypsum binder and the fibers forming the dry mix are agitated during the supply of the preparation water. The preparation water is sprayed into the agitated dry mix in finely-divided form. The prepared mixture, before setting, is spread onto a synthetic resin web and then pressed in the aforedescribed manner. The press pressure is maintained for a length of time sufficient to impart to the intermediate board a sufficient strength.

The thickness of the gypsum/fiber board is determined primarily by the so-called spacer bars which are employed by placing them upon the lower press plate and which flank only two sides of the intermediate board while the two other sides remain peripherally open. As a consequence, the pressure upon the intermediate board tends to decrease toward these edges As a practical matter, it has been found to be necessary to subject the product to a subsequent trimming. If spacer bars are used but the spreading of the prepared mass is not sufficiently uniform, during the pressing of the intermediate product to the finished gypsum/fiber board local pressure differences arise in the pressed product and the gypsum/fiber board will not have sufficiently homogeneous physical parameters such as density and strength.

In addition, the gypsum/fiber board is removed from the press in the conventional system in the form of relatively limp boards or sheets, i.e. so-called green board, which must be supported for further handling and processing operations since the green board is not sufficiently self-supporting.

All of these disadvantages are found in the earlier system which also provides a relatively high preparation of fibers in the prepared mass and requires a relatively large amount of preparation water. As a consequence, water must be expressed from the mass and the pressed-out water must be carried away.

In practice, it has been found further that when the gypsum binder is plaster of Paris, i.e. calcium sulfate beta hemihydrate, and the fibers are cellulose-containing fibers, it is practically impossible to prevent relatively large amounts of air from being entrained into the product in the prepared mixture, so that, during pressing, the entrained air is only partly expelled As a consequence, the plaster board which is obtained by this method shows significant density variations.

The thicker the intermediate product and the pressed gypsum/fiber board, the more these drawbacks affect the quality of the finished product. Indeed it is possible to provide uniform gypsum/fiber board which is of relatively small thickness. Highly stressed gypsum building board, especially floor board, however, of a relatively thick nature could not satisfactorily be made heretofore except by cementing together a plurality of relatively thin gypsum/fiber boards, and indeed while ensuring crossing orientations of the fibers of the boards which are oriented during the spreading operation. The cementing together of thin gypsum/fiber board is expensive.

OBJECTS OF THE INVENTION

It is the principal object of the present invention, therefore, to provide a method of making gypsum/fiber board, especially high-stress structural members like floor boards, whereby the disadvantages of the earlier systems as described above will not arise.

Another object of my invention is to provide a process for making gypsum/fiber board which will yield a product capable to taking up high stresses which will have excellent homogeneity of its physical parameters and which can be made in boards of relatively large thickness.

It is still another object of the invention to provide a method for the purposes described which will yield gypsum/fiber board requiring only a minimum of after-handling and, for example, if possible, no trimming.

SUMMARY OF THE INVENTION

These objects and others which will become apparent hereinafter are attained, in accordance with the invention, in a method of making a gypsum/fiber board, especially of floor board, which comprises the steps of:
(a) forming a gypsum binder consisting essentially of:
  at least 60% by weight of calcium sulfate alpha hemihydrate,
  up to 35% by weight of calcium sulfate beta hemihydrate, and
  any balance to 100 % of at least one finely divided inert substance;
(b) mixing the gypsum binder with an effective amount of a fibrous material in an amount of up to 20 parts by weight of the fibrous substance per 100 parts by weight of the gypsum binder to form a dry mixture;
(c) mixing the dry mixture with mixing water in an amount of the mixing water sufficient to cause setting of the binder and to form a prepared mixture from which water cannot be expressed in subsequent pressing;
(d) filling the pressing mixture into a form bounding a periphery of a cavity having a shape of a board to be formed and pressing the pressing mixture in a press to a shape true to a shape of the cavity and with a pressure adapted to impart to a finished gypsum/fiber board a raw density of at least 1.5 g/cm$^3$ to form an intermediate board; and (e) hardening and drying the intermediate board.

The preparation or mixing water, of course, is sufficient to effect complete hydration of the gypsum binder and, as long as it cannot be expressed from the prepared mass in the press operation as described, can include a small excess over that required for hydration and which facilitates the handling of the mixture and enables the intermediate product to hold together. For example, the excess moisture after pressing and before drying should not exceed 5% by weight of the board.

When reference is made herein to at least 60% by weight of the calcium sulfate alpha hemihydrate, I mean to indicate that the maximum calcium sulfate alpha hemihydrate in the binder is 100% by weight although generally it will be no more than 95% by weight. The reference to 35% by weight of calcium sulfate beta hemihydrate represents the maximum present. The minimum may be 0% by weight although generally at least 5% by weight of the binder should be calcium sulfate beta hemihydrate.

The finely-divided inert components can be grinding or sanding residues or cutting residues (trimming particles) from finished gypsum/fiber board which is already set. While this inert component may make up from 0 to 40% by weight of the binder, preferably it is present in an amount of from 1% to 20% by weight thereof.

100 parts by weight of this binder mixture is combined with up to 20 parts by weight of fibers and the resulting dry mixture is combined with the mixing or preparation water in an amount sufficient to completely hydrate the binder but such that, upon pressing, no water will be expressed from the intermediate product. While observing this latter condition, the preparation or mixing water can include an additional quantity of water beyond that required for complete hydration of the binder but enabling the intermediate product integrity to be maintained as has already been mentioned.

The prepared mixture is placed, in accordance with the invention, in a peripherally-closed form and in this form is pressed to provide the intermediate product with press parameters such that the finished gypsum/fiber board will have a raw density of at least 1.5 g/c$^3$. Naturally, under these conditions, no water should be expressed from the product because of the adjustment of the preparation or mixing water quantity as noted above.

Preferably about 6 parts by weight of cellulose-containing fibers for each 100 parts by weight of the dry binder mixture are employed in the dry mix. Advantageously, moreover, the pressing is carried out so that the raw density of the finished gypsum/fiber board is in excess of 1.5 g/c$^3$. The gypsum binder can include additives so selected that premature setting and hardening does not occur, i.e. the hardening occurs during or subsequent to the pressing operation or, at the earliest, begins with the commencement of the pressing operation.

In the system of the invention, the fibers not only act as a filler, but also as a reinforcement which increases the tensile and bending strengths of the gypsum/fiber board. In a preferred embodiment of the invention, cellulose-containing fibers are mixed with the gypsum binder. The cellulose-containing fibers can be paper fibers derived from paper scraps which are milled together with a portion of the gypsum binder to break up the paper scraps into the fibers. The result is a mass of fibers so integrated into the mixture that the result is highly homogeneous.

The aforementioned 20 parts by weight of fibers can include not only the cellulose fibers, but also strengthening reinforcement fibers such as synthetic resin fibers, mineral fibers and/or metal fibers, but in an amount only up to 5% by weight.

While in the prior art system described above no special gypsum binder was described, with the present invention the gypsum binder must contain at least 60% by weight of the calcium sulfate alpha hemihydrate. With this specific gypsum binder, the quantity of fibers is controlled so that the gypsum/fiber board which results is capable of withstanding high stresses, can have a significant thickness and will have very homogeneous physical parameters.

The thickness of the gypsum/fiber board can, in one layer, be 50 mm or more. The resulting high quality gypsum board also has the advantage that only a minimum of after-machining or shaping is required, inasmuch as the product is pressed in a peripherally-closed form so that the finished gypsum/fiber board will have a raw density of at least 1.5 g/c$^3$. Naturally, since no preparation water is pressed out of the mass, no expressed preparation water need be carried off or create a disposal concern.

It has been found to be advantageous to operate with a gypsum binder in which the calcium sulfate alpha hemihydrate is present in fractions of different fineness. This has been found to contribute to the strength of the gypsum/fiber board and to permit adjustment of the strength thereof.

It has been found to be advantageous to add to the mixture of the gypsum binder and fibers, finely-divided light aggregates, for example, perlite or vermiculite. The inert component added to the binder can be grinding, sawing or like residues in an amount of up to 5% by weight. The dry mixture of the gypsu binder components and the fibers can be mixed with the mixing or preparation water in a throughflow or continuous mixer. To the mixing water, we can feed additives capable of affecting the reaction speed of the gypsum binder. Such additives can also be fed to the finely-divided gypsum binder in dry form.

The intermediate product is pressed in the peripherally-closed form at a press pressure of about 10 to 25 N/mm$^2$, preferably 12 to 20 N/mm$^2$.

According to a feature of the invention, the pressing is so carried out that the intermediate product is vented and compacted to a final state in which the mass does not spring back after compaction. This can be achieved in a simple manner by pressing the intermediate product in the peripherally-closed press form by a pulse pressing operation.

The present invention operates with low fiber mixtures which can be pressed with high press pressures to gypsum/fiber board. The gypsum/fiber board can be removed from the peripherally-closed form, for example, by being pressed therefrom, and can be handled and stacked without significant problems.

According to the invention, the calcium sulfate alpha hemihydrate can be used with different milling fineness. There is described below a set of four milling finenesses which can be used, by way of example, in the production of gypsum/fiber board, the particular milling particle sizes being employed in combination or individually.

| Milling Fineness (1) | Retained at 50 μm sieve size | 0% |
| --- | --- | --- |
| | Retained at 40 μm | 1-2% |
| | Retained at 32 μm | 7-11% |
| | Specific Surface Area (Blaine) | 4200 cm²/g |
| Milling Fineness (2) | Retained at 50 μm sieve size | 1-3% |
| | Retained at 40 μm | 6-10% |
| | Retained at 32 μm | 20-26% |
| | Specific Surface Area (Blaine) | 3900 cm²/g |
| Milling Fineness (3) | Retained at 50 μm sieve size | 12-16% |
| | Retained at 40 μm | 22-24% |
| | Retained at 32 μm | 35-41% |
| | Specific Surface Area (Blaine) | 3000 cm²/g |
| Milling Fineness (4) | Retained at 50 μm sieve size | 20-25% |
| | Retained at 40 μm | 35-41% |
| | Retained at 32 μm | 50-58% |
| | Specific Surface Area (Blaine) | 2300 cm²/g |

Preferably the calcium sulfate alpha hemihydrate is used in milling fineness ! The relatively coarse-grained calcium sulfate alpha hemihydrate appears to promote the venting of the mass. The calcium sulfate beta hemihydrate which is used forms the fine component of the gypsum binder and at least partially fills the interstices between the coarse calcium sulfate alpha hemihydrate particles. This ensures water retention during the pressing, and also reduces any tendency for water to be driven out during the pressing operation.

The proportion of calcium sulfate beta hemihydrate is so established in accordance with the amount of mixing water or preparation water which is added to minimize the air inclusions. According to the invention, the wetting and water retention in the mixture can be improved by the addition of surface-active agents (tensides), methyl cellulose and acetate dispersions.

Apart from the inert grinding, sanding and cutting residues as additives to the binder, other inert components, like foundry and metallurgical plant sand, clay or alumina, cement or the like can be added, although in small quantities, since these additives tend to reduce the strength Some of these additives may be desirable, depending upon the particular use to which the gypsum/fiber board is to be put.

Reinforcing elements can be set into the intermediate product in the form of reinforcing grids, mats and/or reinforcing fabric and, for example, steel reinforcing mat can be introduced into the floor boards if desired.

BRIEF DESCRIPTION OF THE DRAWING

The above and other objects, features and advantages of the present invention will become more readily apparent from the following description, reference being made to the accompanying drawing, the sole FIGURE of which is a flow diagram illustrating the invention.

SPECIFIC DESCRIPTION AND EXAMPLE

From a supply bin 1 containing the gypsum binder of the composition described, a metering device 1a at the bottom thereof feeds the dry binder to a worm conveyor 2 which discharges it into a weighing device 3 which dispenses the binder into a mixer 4.

A supply bin 5 for the grindings and other comminuted detritus from finished gypsum/fiber board is likewise provided with a metering outlet 5a discharging the material into a worm conveyor 6 and from the latter into the weighing unit 7 which dumps into the mixer 4. A scrap-paper treatment station 8 supplies the scrap paper in subdivided form through a weighing and metering unit 9 to a mill 10 in which the paper scraps are comminuted to paper fibers. Additional gypsum binder from the supply bin 11 can be fed through the feeder 11a to the worm conveyor 12 and the weighing device 13 to the mill so that the scrap paper is comminuted with a portion of the gypsum binder in the mill 10 before the resulting mixture is fed to the mixer 4.

A source 14 of reinforcing fibers, especially glass fibers can deposit the glass fibers onto a weighing conveyor 15 or any other suitable metering device for feeding the glass fibers in suitable proportion into the mixer 4.

The dry mix in mixer 4 can consist of 70% by weight calcium sulfate alpha hemihydrate, 25% by weight calcium sulfate beta hemihydrate and 5% by weight of powdered inert material from the grinding, sawing or sanding of the finished gypsum/fiber board, as the binder component. For each 100 parts by weight of the binder consisting in the mixer 4, there are 5 parts by weight of the glass fibers from the glass-fiber preparation stage 14 and the weighing conveyor 15, and 15 parts by weight of paper fiber from the mill 10.

From the dry mixer 4, which is operated discontinuously, the dry mix is fed to a storage bin 16 from which it is metered by a metering unit 16b together with mixing water from a receptacle 18 as metered by the pump 18b to a pair of throughflow mixers 17' which can be worm mixers. The bin 16 may have a closure 16a while the receptacle 18 may have a shut-off valve 18a if required.

The mixing water from receptacle 18 can have additives for accelerating the reaction speed of the gypsum binder or increasing the wettability of the dry mixture as desired The amount of water added and mixed at 17 with the dry mixture is only sufficient to provide a requisite reaction water and does not include any water which can be expressed in the pressing step which follows.

The moist mixture is filled in a box 19 and is accumulated there until the desired weight of the prepared mixture for a single board is collected. Then the box is discharged into a peripherally-closed form in the press 20 and subjected to compression to provide the intermediate product 21.

The press 20 has two rams which apply to the mass in the peripherally-closed form a press pressure of 10 to 25 N/mm², preferably 12 through 20 N/mm².

The preferred pressing is effected by pulse pressing in the form of at least two press closure operations rapidly following one behind the other and between which a venting is permitted. In any case, the intermediate product is pressed in the form so that air trapped in the mixture can escape so that after the pressing there is no springback of the material pressed. The press rams can be provided with nozzles or passages to draw off the dislodged air and can be, if desired, of a sieve-like construction and can be connected to a vacuum source.

The gypsum/fiber board intermediate 21 is removed from the peripherally-closed form and placed upon a hardening belt 22 on which it remains for a hardening time of about 25 minutes. After hardening, the gypsum/fiber board is found to contain about 4% by weight of water which is not chemically bound. The hardened product 23 is passed through a drier, especially a high-frequency drier operated with circulating air to carry away the moisture. The high-frequency drier eliminates the 4% by weight of the unbound water and thus the drying is effected quickly. From the drier, the board can be carried to an after-treatment station in which, if necessary, the edges and at least one surface can be ground or sanded to provide the requisite dimensional precision of the board.

The grinding and sanding waste thus resulting is returned to the bin 5. The finished boards are palletized and can be wrapped or bundled for shipment. The gypsum/fiber board has been found to be especially effective as floor boards for double-floor structures, as underlayment board, as structural slabs for interior construction or the like.

I claim:

1. A method of making a gypsum fiber board comprising the steps of:
    (a) forming a gypsum binder consisting essentially of:
        at least 60% by weight of calcium sulfate alpha hemihydrate,
        from 5 to 35% by weight of calcium sulfate beta hemihydrate, and
        any balance to 100% of at least one finely divided inert substance; then
    (b) dry mixing said gypsum binder with a fibrous material in an amount effective to reinforce said board up to 20 parts by weight of said fibrous material per 100 parts by weight of said gypsum binder thereby forming a dry mixture; then
    (c) mixing said dry mixture with mixing water in an amount of said mixing water sufficient to cause setting of said binder and to form a prepared mixture from which water cannot be expressed in subsequent pressing; then
    (d) filling said prepared mixture into a form bounding a periphery of a cavity having a shape of said board to be formed and pressing said prepared mixture in a press to a shape true to said shape of said cavity and with a pressure adapted to impart to a finished gypsum fiber board a raw density of at least 1.5 g/cm$^3$ to form an intermediate board; and then
    (e) hardening and drying said intermediate board to form said finished gypsum fiber board.

2. The method defined in claim 1 wherein said fibrous material is a material containing cellulose fibers.

3. The method defined in claim 2 wherein said fibrous material includes paper fibers.

4. The method defined in claim 3 wherein paper scraps are milled together with said binder to break said scraps into said paper fibers.

5. The method defined in claim 1 wherein said fibrous material contains up to 5 parts by weight of reinforcing fibers.

6. The method defined in claim 1 wherein said calcium sulfate alpha hemihydrate is present in said dry mixture in fractions of different degrees of fineness.

7. The method defined in claim 1 wherein said dry mixture further has fine-grained light aggregate admixed therein.

8. The method defined in claim 7 wherein said fine-grained light aggregate is selected from the group consisting of perlite and expanded vermiculite.

9. The method defined in claim 1 wherein said binder contains up to 5% by weight of grinding residue from finished gypsum fiber boards.

10. The method defined in claim 1 wherein said dry mixture is mixed with said water in a continuous through-flow mixer.

11. The method defined in claim 1, further comprising the step of admixing with said mixing water at least one additive for controlling a rate of setting of said binder.

12. The method defined in claim 1 wherein said intermediate board is pressed in said form with a press pressure of 10 to 25 N/mm$^2$.

13. The method defined in claim 12 wherein said press pressure is 12 to 20 N/mm$^2$.

14. The method defined in claim 1 wherein said intermediate board is vented during pressing in said press and is pressed to its final form without springback of any constituents forming said intermediate board.

15. The method defined in claim 1 wherein said intermediate board is pressed in said press by pulse pressing.

16. The method defined in claim 1 wherein said fibrous material is a material containing cellulose fibers formed by milling paper scraps together with said binder to break said scraps into said paper fibers, said fibrous material containing up to 5 parts by weight of reinforcing fibers.

17. The method defined in claim 16 wherein said calcium sulfate alpha hemihydrate is present in said dry mixture in fractions of different degrees of fineness, and said dry mixture further has fine-grained light aggregate admixed therein.

18. The method defined in claim 17 wherein said fine-grained light aggregate is selected from the group consisting of perlite and expanded vermiculite.

19. The method defined in claim 18 wherein said binder contains up to 5% by weight of grinding residue from finished gypsum fiber boards, said dry mixture being mixed with said water in a continuous through-flow mixer.

20. The method defined in claim 19, further comprising the step of admixing with said mixing water at least on additive for controlling a rate of setting of said binder, said intermediate board being pressed in said form with a press pressure of 12 to 20 N/mm$^2$.

* * * * *